(12) United States Patent
Whitney et al.

(10) Patent No.: US 11,320,006 B2
(45) Date of Patent: May 3, 2022

(54) POWER TAKEOFF CONTROL

(71) Applicant: Zimeno, Inc., Fremont, CA (US)

(72) Inventors: Christopher Travis Whitney, Palo Alto, CA (US); Rama Venkata Surya Kumar Varma Bhupatiraju, Milpitas, CA (US); Mizbauddin Mohammed, Fremont, CA (US); Bhargav Ramakrishna Reddy, Fremont, CA (US)

(73) Assignee: Zimeno, Inc., Livermore, CA (US)

( * ) Notice: Subject to any disclaimer, the term of this patent is extended or adjusted under 35 U.S.C. 154(b) by 0 days.

(21) Appl. No.: 17/149,640

(22) Filed: Jan. 14, 2021

(65) Prior Publication Data

US 2021/0222743 A1 Jul. 22, 2021

Related U.S. Application Data

(60) Provisional application No. 62/962,762, filed on Jan. 17, 2020.

(51) Int. Cl.
*F16D 48/06* (2006.01)
*B60K 17/28* (2006.01)

(52) U.S. Cl.
CPC ............ *F16D 48/064* (2013.01); *B60K 17/28* (2013.01); *F16D 2300/18* (2013.01); *F16D 2500/10437* (2013.01); *F16D 2500/3148* (2013.01); *F16D 2500/70647* (2013.01)

(58) Field of Classification Search
CPC ............... F16D 2500/70647; F16D 2500/3148
See application file for complete search history.

(56) References Cited

U.S. PATENT DOCUMENTS

| | | | |
|---|---|---|---|
| 2006/0113139 A1 | 6/2006 | Nishi et al. | |
| 2017/0192428 A1 | 7/2017 | Vogt et al. | |
| 2018/0061063 A1 | 3/2018 | Buyokozturk et al. | |

FOREIGN PATENT DOCUMENTS

EP 2878186 3/2015

OTHER PUBLICATIONS

PCT International Search Report for PCT/US2021013511 dated Mar. 18, 2021.

*Primary Examiner* — Timothy Hannon
(74) *Attorney, Agent, or Firm* — Rathe Lindenbaum LLP

(57) ABSTRACT

A power takeoff control system and method sense proximity of an operator to a power takeoff and control operation of the power takeoff based upon the sensed proximity.

20 Claims, 2 Drawing Sheets

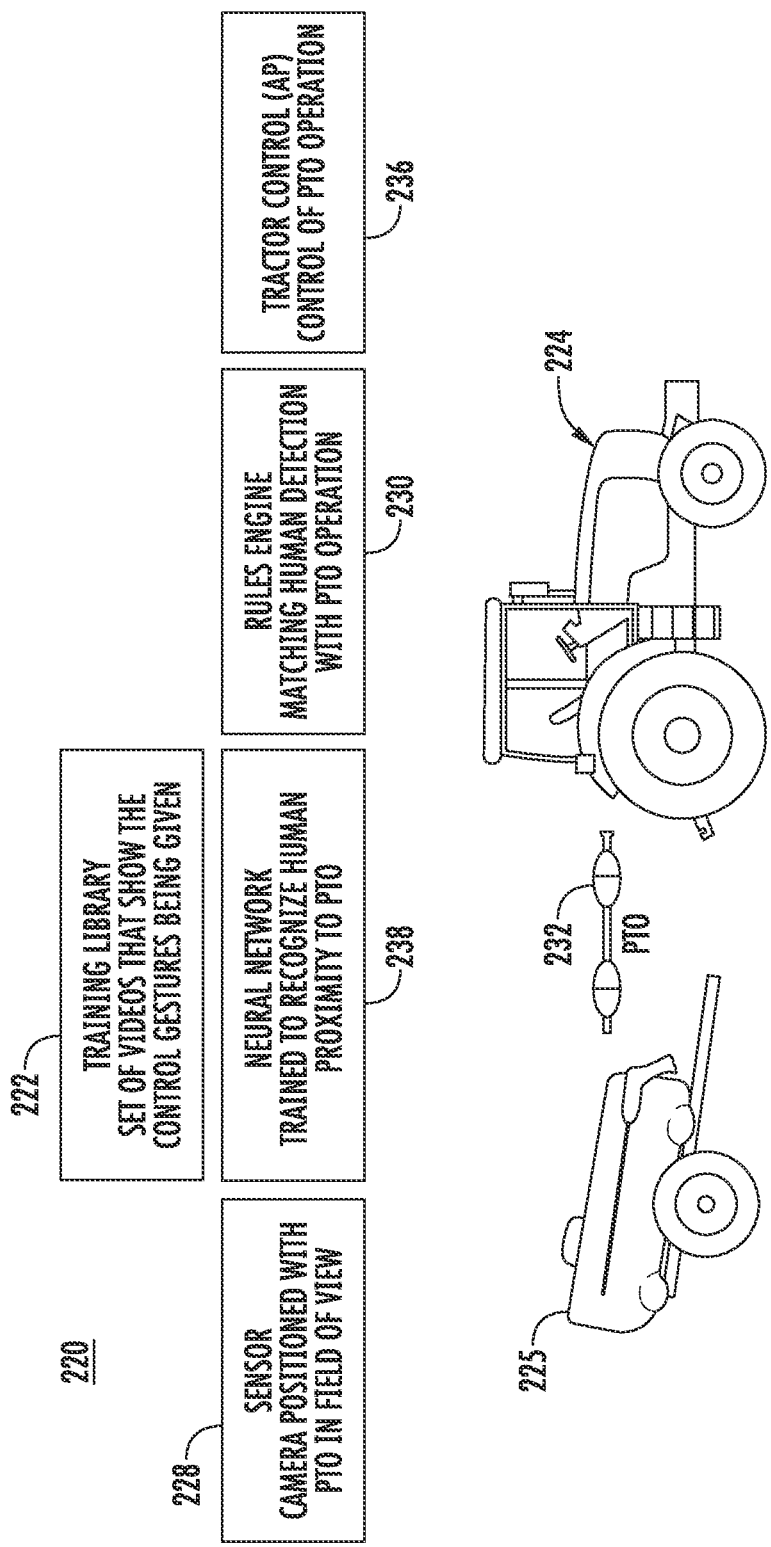

POWER TAKEOFF CONTROL

CROSS-REFERENCE TO RELATED PATENT APPLICATIONS

The present application is a US nonprovisional application claiming priority from U.S. provisional patent application Ser. No. 62/962,762 filed on Jan. 17, 2020 by Whitney et al. and entitled POWER TAKEOFF CONTROL, the full disclosure of which is hereby incorporated by reference.

BACKGROUND

Power takeoffs (PTOs) are provided on vehicles to deliver power to attached implements or separate machines. Many power takeoffs deliver power from the vehicle's power source, such as a running engine, to the power takeoff. Many power takeoffs are in the form of a splined driveshaft installed on the vehicle, such as a tractor or truck, which facilitates the powering of implements with mating fittings.

BRIEF DESCRIPTION OF THE DRAWINGS

FIG. 3 is a diagram schematically illustrating portions of an example power takeoff control system.

Figure 1:
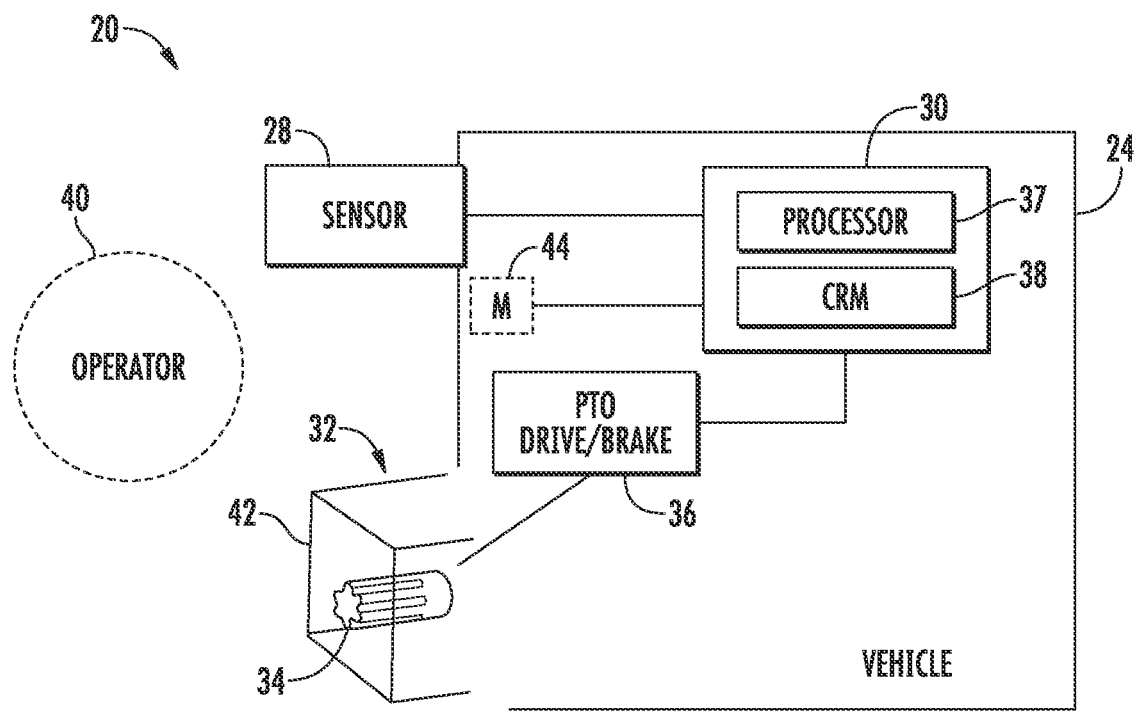
FIG. 1 is a block diagram schematically illustrating portions of an example power takeoff control system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example vehicles, power takeoff control systems and power takeoff control methods that control operation of the power takeoff based upon a sensed proximity of an operator to the power takeoff. In circumstances where an operator may be too close to the power takeoff, the power takeoff may be prevented from being powered or turned on. In circumstances where the operator may be too close to the power takeoff while the power takeoff is running, the power takeoff may be braked or slowed. As a result, such example vehicles, control systems and control methods reduce the likelihood of the operator becoming entangled in the power takeoff.

Disclosed is an example power takeoff control system that may comprise a sensor to be supported so as to output proximity signals indicating a proximity of an operator to a power takeoff and a controller to output control signals for controlling the power takeoff based on the signals.

Disclosed is an example power takeoff control method that may comprise sensing proximity of an operator to a power takeoff and controlling operation of the power takeoff based upon the sensed proximity.

Disclosed an example vehicle that may comprise a power takeoff, a sensor to be supported so as to output proximity signals indicating a proximity of an operator to a power takeoff, and a controller to output control signals for controlling the power takeoff based on the signals.

FIG. 1 is a diagram schematically illustrating portions of an example power takeoff control system 20. Control system 20 comprises vehicle 24, sensor 28 and controller 30. Vehicle 24 comprises a self-propelled vehicle having a power takeoff 32. Power takeoff 32 comprises a device for transferring mechanical power, torque, to another piece of equipment, attachment or implement that may lack its own engine or motor or that may require additional power from vehicle 24. In the example illustrated, power takeoff 32 comprises a splined shaft 34 rotatably driven by PTO drive/brake system 36. In one implementation, power takeoff 32 satisfies standards set forth in ISO 500 for power takeoffs.

Drive/brake system 36 receives power from an internal combustion engine or an electric motor associated with the vehicle, wherein generated power delivered to the drive/brake system by transmission. In one implementation, the power may be transmitted by a hydraulic transmission, wherein pressurized hydraulic fluid supplied by pump and transmitted to a hydraulic motor which rotatably drives the splined shaft 34. In other implementations, electric motor may drive splined shaft 34. In yet other implementations, other mechanical transmissions may transmit power from the engine or motor to the splined shaft 34.

Drive/brake system 36 further controls the speed of splined shaft 34. In one implementation, drive/brake system 36 comprises a brake to slow or stop rotation of shaft 34. In some implementations, drive/brake system 36 comprises a frictional brake. In other implementations, drive/brake system 36 comprises a clutch which disengages splined shaft 34 from a torque source. Examples of vehicle 24 which may comprise PTO 32 include, but are not limited to, trucks and tractors. In other implementations, vehicle 24 may comprise other types of vehicles, wherein the vehicle is provided with a power takeoff 32.

Sensor 28 comprises at least one sensor supported so as to output proximity signals indicating a proximity of an operator 40 to the splined shaft 34 of power takeoff 32. In one implementation, sensor 28 is supported by vehicle 24. In some implementations, sensor 28 may be supported by an outer box or shield 42 partially surrounding splined shaft 34. In some implementations, sensor 28 may be mounted within shaft 34 itself. In other implementations, sensor 28 may be supported to a side or above splined shaft 34. In still other implementations, sensor 28 may be supported by an implementer attachment that is to receive power from splined shaft 34, wherein the remote sensor 28 transmit signals to controller 30 in a wired or wireless fashion.

In some implementations, sensor 28 comprises at least one camera supported by vehicle 24 for capturing images or videos of regions about splined shaft 34. In some implementations, sensor 28 (sometimes referred to as a proximity sensor) senses the proximity of the operator to the shaft 34 of power takeoff 32 by emitting an electromagnetic field and detecting changes in the field. In other implementations, sensor 28 may comprise other forms of non-contact or wireless sensors such as lidar, radar, ultrasonic sensors and the like. In some implementations, different types of sensors be utilized.

Controller 30 outputs control signals for controlling the power takeoff 32 based upon signals from sensor 28. Controller 30 may comprise a processor 37 and a non-transitory computer-readable medium 38. Processor 37 carries out instructions provided on medium 38. The instructions stored in medium 38 may cause processor 37 to analyze signal from sensor 28 regarding the proximity of operator 40 to PTO 32 and to output control signals adjusting the operation of PTO 32.

In one implementation, the instructions contained in medium 38 cause processor 37 to determine a distance spacing the operator 40 from splined shaft 34 using or based upon signals from sensor 28. Upon determining a distance between the operator 40 and the splined shaft 34 of power takeoff 32, the instructions in medium 38 cause processor 37 to compare such distance to a predefined threshold distance (also stored in medium 38). Based upon the comparison, the instructor may direct processor 37 to output control signals adjusting the operation of power takeoff 32. For example, in circumstances where the operator 40 is too close to the splined shaft 34 of power takeoff 32, processor 37 of controller 30 may output control signals that cease the supply of power to splined shaft 34, that actuate a clutch to disconnect splined shaft 34 from a torque source, or that brake the rotation of splined shaft 34. In some implementations, controller 30 may output control signals inhibiting the turning on of PTO 32 and initiating rotation of splined shaft 34 based upon signals from sensor 28 indicating that operator 40 is too close to splined shaft 34.

In some implementations, in circumstances where the splined shaft 34 is already being rotatably driven by PTO drive/brake 36, controller 30 may output control signals, based upon signals from sensor 28, causing PTO drive/brake 36 to automatically brake operation or rotation of shaft 34 in response to proximity signals from sensor 28 indicating that operator 40 is within a predefined distance of shaft 34. In such an implementation, controller 30 may also be configured to automatically reinitiate the operation of power takeoff 32, reinitiate the driven rotation of shaft 34, in response to proximity signals from sensor 28 indicating that operator 40 is no longer within the predefined distance from shaft 34.

In some implementations, controller 30 may be part of a larger neural network that is trained to recognize operator proximity to the shaft 34 of the power takeoff 32 based upon a set of videos depicting variations in operator proximity to the power takeoff 32. In some implementations, controller 30 is additionally configured to maintain operation of the power takeoff 32 in response to an override input despite proximity of operator 40 to the power takeoff shaft 34 which might otherwise result in operation of the power takeoff 32 being braked or discontinued. For example, as shown by broken lines, vehicle 24 may include a microphone 44 for receiving audible commands, such as an override command, from an operator. Such an override may be beneficial in circumstances where operator 40 may need to travel or position himself or herself in close proximity to the splined shaft 34 while it is being currently driven, but where it may be important for power takeoff system 32 to continue to supply power without interruption. In such a circumstance, the operator may speak the override command which is captured by microphone 44, wherein controller 30, using speech or voice recognition, identifies the override command and overrides the otherwise automatic operational adjustment of PTO 32 that would result in shaft 34 being braked or otherwise stopped. Because overriding the otherwise automatic stoppage of the rotation of shaft 34 demands audible input from the operator 40, the operator 40 is more likely to be cognizant of the ongoing rotation of shaft 34 and may be more cautionary when working around the driven shaft 34 of power takeoff 32.

Figure 2:
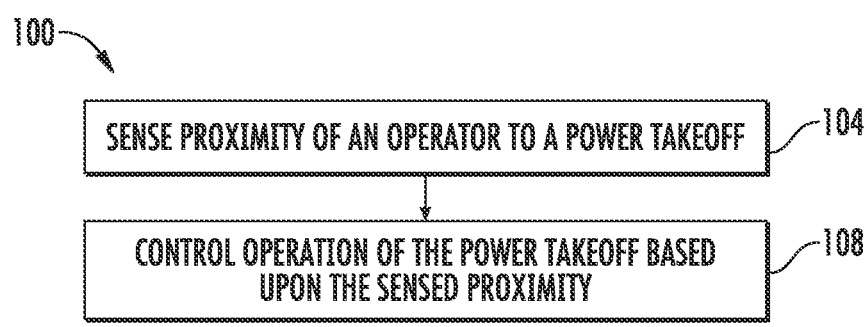
FIG. 2 is a flow diagram of an example power takeoff control method.

FIG. 2 is a flow diagram of an example power takeoff control method 100. Method 100 controls operation of the power takeoff based upon a sensed proximity of an operator to the power takeoff. In circumstances where an operator may be too close to the power takeoff, the power takeoff may be prevented from being powered or turned on. In circumstances where the operator may be too close to the power takeoff while the power takeoff is running, the power takeoff may be braked or slowed. As a result, such example vehicles, control systems and control methods reduce the likelihood of the operator becoming entangled in the power takeoff. Although method 100 is described in the context of being carried out by system 20, should be appreciated that method 100 may likewise be carried out with similar vehicles or systems having a power takeoff and a sensor for sensing proximity of an operator to the power takeoff.

As indicated by block 104, sensor 28 senses the proximity of an operator 40 relative to power takeoff 32, relative to shaft 34. Such signals may directly or indirectly indicate the proximity of operator 40. In circumstance where the signals indirectly indicate the proximity of operator 40 to shaft 34, controller 30 may determine the proximity of operator 40 to shaft 34 from the signals.

As indicated by block 108, based upon the sensed proximity, controller 30 controls operation of the power takeoff 32. In some implementations, controller 30 outputs control signals causing PTO drive/brake 36 to brake the rotation of splined shaft 34. In some implementations, controller 30 may additionally or alternatively disconnect splined shaft 34 from a torque source or source of power. For example, controller 30 may actuate a clutch so as to operably disconnect splined shaft 34 from the torque source or source of power.

In some implementations, based upon the sensed proximity, controller 30 may inhibit the startup of PTO 32. In some implementations, based upon the sensed proximity, controller 30 may stop or slow the ongoing driven rotation of shaft 34. As discussed above, in some implementations, method 100 being carried out by controller 30 may automatically stop rotation of shaft 34 in response to or based upon the sense proximity of operator 40 and may automatically reinitiate or speed back up the driven rotation of splined shaft 34 once the operator 40 is no longer within the predefined spacing or proximity to shaft 34. As also discussed above, in some implementations, method 100 may involve the temporary overriding of the braking or operational change of power takeoff 32 in response to an override command provided by operator 40.

FIG. 3 is a diagram schematically illustrating portions of an example power takeoff control system 220 associated with a tractor 224 and an example implement 225 drawing mechanical power (torque) from tractor 224 via power takeoff 232. In the example illustrated, the system utilizes a training library 222 in the form of a set of videos that show human proximity to the power takeoff. A sensor and camera 228 positioned with the PTO 232 in the field of view provides images of region surrounding the PTO 232. The neural network 238 is trained to recognize human proximity to the PTO 232. The rules engine 230, in the form of a processor and associated instructions provided on a computer-readable medium, identify when a human operator is sufficiently proximate to the PTO. The tractor control (API) 236 controls operation of the PTO 232 based upon determinations made by the rule engine 230. In circumstances where the operator is too close to the PTO 232, the tractor control may prevent initiation of PTO operation or automatically brake or stop the supply of power to the PTO 232.

Although the present disclosure has been described with reference to example implementations, workers skilled in the art will recognize that changes may be made in form and detail without departing from disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A power takeoff control system comprising:
   a sensor to be supported so as to output proximity signals indicating a proximity of an operator to a power takeoff of a vehicle while the operator is not residing in or on the vehicle; and
   a controller to output control signals for controlling the power takeoff based on the signals.

2. The control system of claim 1, wherein the sensor comprises at least one camera.

3. The control system of claim 1, wherein the sensor comprises at least one proximity sensor that emits electromagnetic field and detects changes in the field.

4. The control system of claim 1, wherein the control signals are to control actuation of a power takeoff clutch or power takeoff brake.

5. The control system of claim 1, wherein the controller is to:
   determine a distance between the operator and the power takeoff; and
   compare the distance to a predefined threshold, wherein the control signals are based upon the comparison.

6. The control system of claim 1, wherein the controller is part of a neural network trained to recognize operator proximity to the power takeoff based upon a set of videos depicting variations in operator proximity to the power takeoff.

7. The control system of claim 1 further comprising a vehicle including the power takeoff, wherein the sensor is mounted to the vehicle.

8. The control system of claim 1, wherein the controller is to recognize an override input, the override input being received from the operator while the operator is not residing in or on the vehicle, and wherein the controller actuates or maintains operation of the power takeoff in response to the override input despite proximity the operator to the power takeoff that would otherwise result in operation of the power takeoff being braked or discontinued.

9. The control system of claim 1, wherein the controller is to automatically brake operation of the power takeoff in response to the proximity signals and is to automatically reinitiate power takeoff operation in response to the proximity signals.

10. A power takeoff control method comprising:
    sensing proximity of an operator to a power takeoff; and
    controlling operation of the power takeoff based upon the sensed proximity, wherein the sensing of the proximity of the operator to the power takeoff comprises capturing an image of the power takeoff and surrounding proximity.

11. The method of claim 10, wherein the sensing of the proximity of the operator to the power takeoff comprises emitting an electromagnetic field and detecting changes in the field.

12. The method of claim 10, wherein the controlling of the operation of the power takeoff comprises controlling actuation of a power takeoff clutch or power takeoff brake.

13. The method of claim 10, wherein the controlling of the operation of the power takeoff comprises:
    determining a distance between the operator and the power takeoff; and
    comparing the distance to a predefined threshold, wherein the control signals are based upon the comparison.

14. The method of claim 10 further comprising training a neural network trained to recognize operator proximity to the power takeoff based upon a set of images depicting variations in operator proximity to the power takeoff.

15. The method of claim 10 further comprising:
    receiving an override input from an operator while the operator is not residing in or on the vehicle; and
    continuing operation of the power takeoff in response to the override input.

16. The method of claim 10 comprising:
    automatically braking operation of the power takeoff based upon the sensed proximity; and
    automatically reinitiating operation of the power takeoff based upon the sensed proximity.

17. A vehicle comprising:
    a power takeoff;
    a sensor to be supported so as to output proximity signals indicating a proximity of an operator to a power takeoff of the vehicle while the operator is not residing in or on the vehicle; and
    a controller to output control signals for controlling the power takeoff based on the signals.

18. The vehicle of claim 17, wherein the controller is to:
    determine a distance between the operator and the power takeoff; and
    compare the distance to a predefined threshold, wherein the control signals are based upon the comparison.

19. The vehicle of claim 17, wherein the sensor comprises a camera for capturing an image of the power takeoff and surrounding proximity.

20. A power takeoff control system comprising:
    a sensor to be supported so as to output proximity signals indicating a proximity of an operator to a power takeoff; and
    a controller to output control signals for controlling the power takeoff based on the signals, wherein the controller is to:
    determine a distance between the operator and the power takeoff; and
    compare the distance to a predefined threshold, wherein the control signals are based upon the comparison.

* * * * *